United States Patent
Kazama et al.

(10) Patent No.: US 8,205,103 B2
(45) Date of Patent: Jun. 19, 2012

(54) POWER-SOURCE CONTROL SYSTEM AND METHOD TO SUPPLY AND CONTROL POWER TO AN INFORMATION PROCESSING APPARATUS

(75) Inventors: Satoshi Kazama, Kawasaki (JP); Yoshiyasu Nakashima, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 12/536,936

(22) Filed: Aug. 6, 2009

(65) Prior Publication Data

US 2010/0169674 A1 Jul. 1, 2010

(30) Foreign Application Priority Data

Sep. 26, 2008 (JP) ................................ 2008-248553

(51) Int. Cl.
*G06F 1/26* (2006.01)
(52) U.S. Cl. .................... 713/300; 713/320; 713/324
(58) Field of Classification Search ........... 713/300–340
See application file for complete search history.

(56) References Cited

U.S. PATENT DOCUMENTS

| | | | |
|---|---|---|---|
| 6,504,266 B1* | 1/2003 | Ervin | 307/29 |
| 6,785,827 B2* | 8/2004 | Layton et al. | 713/300 |
| 7,206,949 B2* | 4/2007 | Kuranuki | 713/320 |
| 7,337,333 B2* | 2/2008 | O'Conner et al. | 713/300 |
| 7,519,843 B1* | 4/2009 | Buterbaugh et al. | 713/322 |
| 7,555,666 B2* | 6/2009 | Brundridge et al. | 713/340 |
| 7,761,718 B2* | 7/2010 | Yasuo et al. | 713/300 |
| 7,900,067 B2* | 3/2011 | Beard | 713/300 |
| 8,032,776 B2* | 10/2011 | Merkin | 713/324 |
| 2007/0186120 A1* | 8/2007 | Yasuo et al. | 713/300 |
| 2010/0017636 A1* | 1/2010 | Hashimoto et al. | 713/322 |
| 2010/0058086 A1* | 3/2010 | Lee | 713/322 |

FOREIGN PATENT DOCUMENTS

JP 05-091660 4/1993
JP 07-264776 10/1995

* cited by examiner

*Primary Examiner* — Raymond Phan
(74) *Attorney, Agent, or Firm* — Staas & Halsey LLP

(57) ABSTRACT

A power-source control system and method which calculates required power representing electric power to be supplied to an information processing apparatus, supplies electric power corresponding to the required power calculated, controls the power-source apparatus, generates frequency information representing an operating frequency to be determined by the frequency controller in accordance with a load of a CPU, and changes the operating frequency of the CPU by assigning the operating frequency represented by the frequency information to the CPU when the electric power to be used in the information processing apparatus is adjusted using the required power calculated.

10 Claims, 9 Drawing Sheets

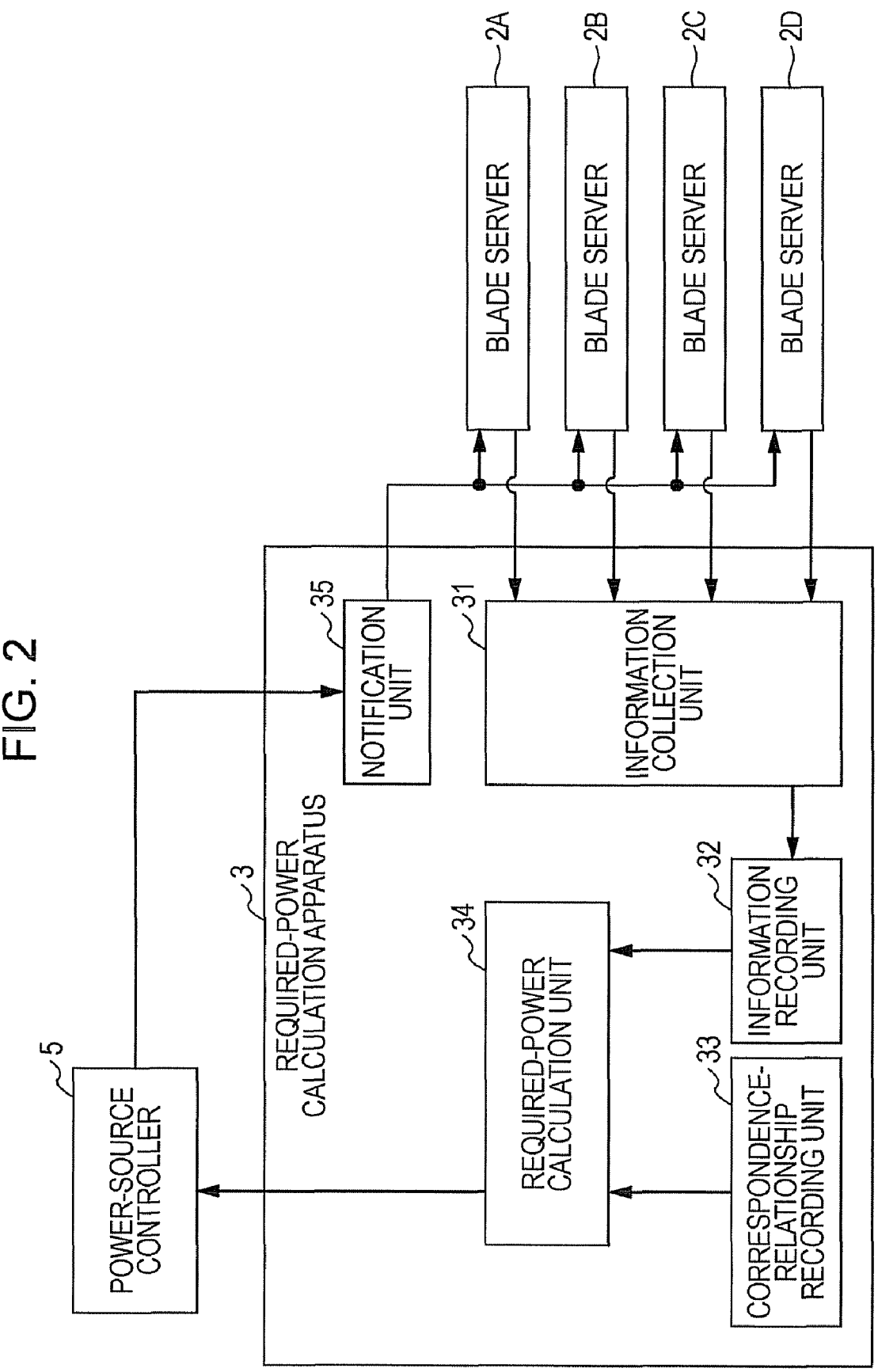

FIG. 3

| BLADE SERVER | FREQUENCY INFORMATION | COMMUNICATION STATE INFORMATION | |
|---|---|---|---|
| BLADE SERVER 2A | 3GHz | COMMUNICATION START | ~R₁ |
| BLADE SERVER 2B | 2.5GHz | COMMUNICATION STOP | ~R₂ |
| BLADE SERVER 2C | 2GHz | COMMUNICATION START | ~R₃ |
| BLADE SERVER 2D | 3GHz | COMMUNICATION STOP | ~R₄ |

| FREQUENCY INFORMATION | REQUIRED POWER | |
|---|---|---|
| 3GHz | 80W | ~R₁ |
| 2.5GHz | 50W | ~R₂ |
| 2GHz | 10W | ~R₃ |

| COMMUNICATION STATE INFORMATION | REQUIRED POWER | |
|---|---|---|
| COMMUNICATION START | 10W | ~R₁ |
| COMMUNICATION STOP | 1W | ~R₂ |

| REQUIRED POWER P | POWER-SUPPLY UNIT | |
|---|---|---|
| $0 \leq P < 100$ | POWER-SUPPLY UNIT 42A | $R_1$ |
| $100 \leq P < 200$ | POWER-SUPPLY UNIT 42A, 42B | $R_2$ |
| $200 \leq P < 300$ | POWER-SUPPLY UNIT 42A TO 42C | $R_3$ |
| $300 \leq P$ | POWER-SUPPLY UNIT 42A TO 42D | $R_4$ |

51A

POWER-SOURCE CONTROL SYSTEM AND METHOD TO SUPPLY AND CONTROL POWER TO AN INFORMATION PROCESSING APPARATUS

CROSS-REFERENCE TO RELATED APPLICATIONS

This application claims the benefit of priority from Japanese Patent Application No. 2008-248553 filed on Sep. 26, 2008, which is herein incorporated by reference in its entirety.

BACKGROUND

1. Field

The present invention relates to a power-source control system including at least one information processing apparatus, a required-power calculation apparatus which calculates electric power to be supplied to the information processing apparatus, a power-source apparatus which supplies electric power calculated using the required-power calculation apparatus to the information processing apparatus, and a power-source control apparatus which controls the power-source apparatus, and a power-source control method.

2. Description of the Related Art

General power-source apparatuses which supply electric power to information processing apparatuses, such as personal computers and servers, are known (refer to Japanese Patent Laid-Open No. 5-91660 and Japanese Patent Laid-Open No. 7-264776).

Such a power-source apparatus should attain high efficiency of power conversion as well as significant power, multi output, output stability against load change, and miniaturization.

Note that the efficiency of power conversion is represented by a rate of input power to output power.

That is, the lower the efficiency of power conversion, the larger heat-generation quantity of the power-supply apparatus (heat quantity generated due to electric power which is not output).

Therefore, such a power-source apparatus should include a cooling structure, such as a cooling fan.

Accordingly, since electric power should be supplied to the cooling structure, electric power which is unnecessarily consumed increases.

On the other hand, the higher the efficiency of power conversion, the lower the power-generation quantity of the power-source apparatus.

Therefore, a cooling structure is not required for the power-source apparatus having the high efficiency of power conversion.

Therefore, unnecessary electric power is less consumed.

Accordingly, the power-source apparatuses preferably have high efficiency of power conversion.

Note that it is known that the efficiency of power conversion of such a power-source apparatus is generally changed in accordance with consumption current of information processing apparatus(es).

FIG. 11 is a diagram illustrating a relationship between efficiency of power conversion of a power-source apparatus and consumption current of an information processing apparatus.

In an example illustrated in FIG. 11, when a consumption current of the information processing apparatus is 10A, the highest efficiency of power conversion is attained (efficiency of power conversion of 90%).

As the consumption current of the information processing apparatus becomes larger than 10A, and as the consumption current of the information processing apparatus is reduced so as to be smaller than 10A, the efficiency of power conversion is lowered.

Specifically, when a consumption current of the information processing apparatus is 20A, the efficiency of power conversion is 75%.

When a consumption current of the information processing apparatus is 2A, the efficiency of power conversion is 60%.

That is, the efficiency of power conversion is low when the consumption current of the information processing apparatus is high (20A in the example illustrated in FIG. 11) and when the consumption current of the information processing apparatus is low (2A in the example illustrated in FIG. 11). Therefore, there is a demand for a method and system for attaining high efficiency of power conversion in these cases.

To meet such a demand, a power-source control system including two power-source apparatuses, i.e., a DC/DC converter and a series regulator, a detector which detects a consumption current of an information processing apparatus, and a switch unit which selects one of the two power-source apparatuses to be used in accordance with a detected consumption current has been proposed (refer to Japanese Patent Laid-Open No. 5-91660).

Note that the DC/DC converter is a power-source apparatus which attains high efficiency of power conversion when consumption current of an information processing apparatus is large.

On the other hand, the series regulator is a power-source apparatus which attains high efficiency of power conversion when the consumption current of the information processing apparatus is small.

That is, the switch unit selects the DC/DC converter as the power-source apparatus when the consumption current of the information processing apparatus is large.

On the other hand, when the consumption current of the information processing apparatus is small, the series regulator is selected as the power-source apparatus to be used.

By this, in the both cases where the consumption current of the information processing apparatus is large and small, the high efficiency of power conversion of the power-source apparatuses is maintained.

SUMMARY

According to an embodiment of the present invention, a power-source control system and method calculate required power representing electric power to be supplied to at least one information processing apparatus, supply the electric power calculated to the information processing apparatus, and control the power-source apparatus. The information processing apparatus, which is included in the power-source control system, includes a CPU configured to operate in accordance with each of various operating frequencies, a load measurement unit configured to measure a load of the CPU, a frequency controller configured to determine an operating frequency to be assigned to the CPU from among the various operating frequencies so that when a heavy load is applied to the CPU, a high operating frequency is attained whereas when a light load is applied to the CPU, a low operating frequency is attained, a load determination unit configured to generate frequency information representing the operating frequency to be determined by the frequency controller in accordance with the load of the CPU, and to transmit the generated frequency information to the required-power calculation apparatus.

The required power representing electric power required for the information processing apparatus is calculated so that the CPU operates at the operating frequency represented by the frequency information received. The power-source controller, which is included in the system, controls the power-source apparatus so that a highest efficiency of power conversion is attained in the power-source apparatus when the power-source apparatus supplies the required power calculated by the required-power calculation apparatus to the information processing apparatus. The power-supply apparatus, which is included in the system, adjusts electric power to be used in the information processing apparatus by supplying electric power corresponding to the required power calculated by the required power calculation apparatus to the information processing apparatus. The frequency controller, which is included in the system, changes the operating frequency of the CPU by assigning the operating frequency represented by the frequency information to the CPU when the electric power to be used in the information processing apparatus is adjusted using the required power calculated by the required-power calculation unit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates a schematic configuration of a required-power calculation apparatus;

FIG. 3 illustrates examples of a correspondence relationship between frequency information and communication-state information which are recorded in an information recording unit;

FIGS. 4A and 4B illustrate example(s) of a correspondence relationship recorded in a correspondence-relationship recording unit;

FIG. 6 illustrates examples of operation-control information recorded in an operation-control recording unit;

DETAILED DESCRIPTION OF EMBODIMENTS

Figure 1:
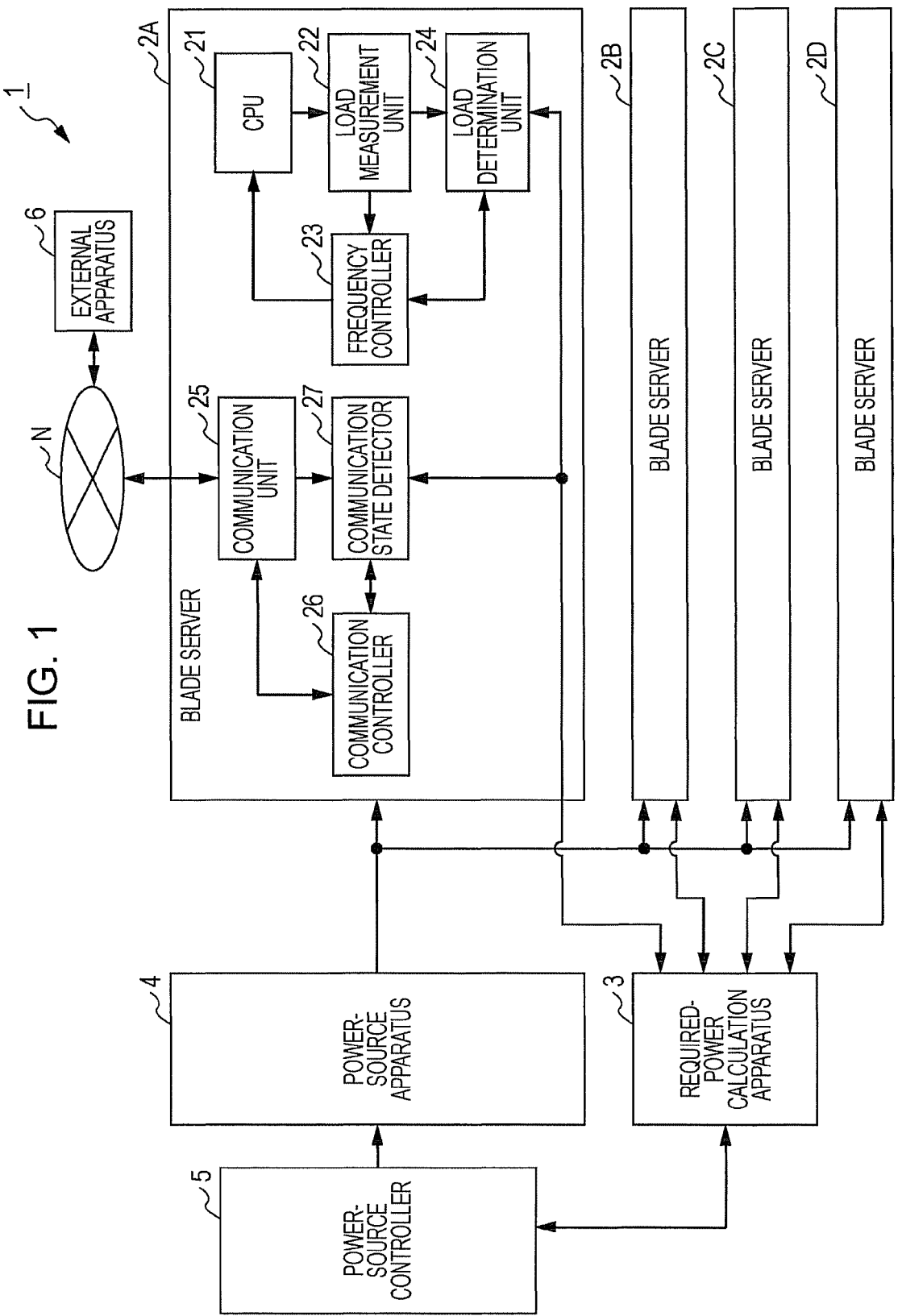
FIG. 1 illustrates a schematic configuration of a power-source control system according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

In typical power-source control systems, one of two power-source apparatuses is selected to be used in accordance with a consumption current of an information processing apparatus. Therefore, if the consumption current of the information processing apparatus considerably increases, for example, at least the following problem arises.

That is, the selection of one of the power-source apparatuses by the switch unit may delay.

Specifically, if the consumption current of the information processing apparatus drastically increases, the DC/DC converter for a large consumption current should be used as a power-source apparatus. However, since the selection performed by the switch unit delays, the series regulator for a small consumption current is used as the power-source apparatus for a certain period of time.

That is, in this period of time, although the consumption current of the information processing apparatus is large, the series regulator is used as the power-source apparatus.

However, the series regulator is not capable of supplying sufficient power to the information processing apparatus, and therefore, a problem (such as system down and malfunction) may arise in the information processing apparatus.

A power-source control system described hereinafter maintains high efficiency of power conversion of a power-source apparatus while occurrence of malfunction is prevented.

According to an aspect of the present invention, a load determination unit may determine whether a load of a CPU is smaller than a threshold value, instruct a frequency controller to assign an operating frequency to be determined by the frequency controller in accordance with the load of the CPU when it is determined that the load of the CPU is smaller than the threshold value, generate frequency information representing the operating frequency assigned to the CPU by the frequency controller when the operating frequency of the CPU is lowered by assigning the operating frequency to the CPU by the frequency controller in accordance with the instruction, and transmit the generated frequency information to the required-power calculation apparatus. The power-source apparatus may reduce the electric power to be used in the information processing apparatus by supplying the required power calculated by the required-power calculation apparatus to the information processing apparatus.

Accordingly, since the electric power to be used in the information processing apparatus is reduced after the operating frequency of the CPU is lowered, shortage of the electric power used in the information processing apparatus is prevented.

In contrast, if the operating frequency of the CPU is lowered after the electric power to be used in the information processing apparatus is reduced, the shortage of the electric power used in the information processing apparatus occurs in a period of time from when the electric power to be used in the information processing apparatus is reduced to when the operating frequency of the CPU is lowered.

As described above, according to this aspect, since the electric power to be used in the information processing apparatus is reduced after the operating frequency of the CPU is lowered, the shortage of the electric power in the information processing apparatus is prevented.

Therefore, malfunction of the information processing apparatus is prevented.

According to this aspect of the present invention, in a case where the communication between the communication unit and an external apparatus is being performed, the communication-state detector may instruct the communication controller to stop the communication between the communication unit and the external apparatus when detecting a stop-requesting signal requesting stop of the communication between the communication unit and the external apparatus, generate communication-state information representing that the communication between the communication unit and the external apparatus is stopped when the communication between the communication unit and the external apparatus is stopped in accordance with the instruction, and transmit the generated communication-state information to the required-power calculation apparatus. The power-source apparatus may reduce the electric power to be used in the information processing apparatus by supplying the required power calculated by the required-power calculation apparatus to the information processing apparatus.

According to this aspect, since the electric power to be used in the information processing apparatus is reduced after the communication between the communication unit and the external apparatus is stopped, shortage of the electric power used in the information processing apparatus is prevented.

In contrast, if the communication between the communication unit and the external apparatus is stopped after the electric power to be used in the information processing apparatus is reduced, the shortage of the electric power used in the information processing apparatus occurs in a period of time from when the electric power to be used in the information processing apparatus is reduced to when the communication between the communication unit and the external apparatus is stopped.

As described above, according to this aspect, since the electric power to be used in the information processing apparatus is recued after the communication between the communication unit and the external apparatus is stopped, the shortage of the electric power in the information processing apparatus is prevented.

Therefore, malfunction of the information processing apparatus is prevented.

An embodiment of the present invention is described in detail hereinafter with reference to the accompanying drawings.

FIG. 1 is a block diagram schematically illustrating a configuration of a power-source control system 1 according to an embodiment of the present invention.

The power-source control system 1 includes blade servers 2A to 2D, a required-power calculation apparatus 3, a power-source apparatus 4, and a power-source control apparatus 5.

Note that each of the blade servers 2A to 2D is an independent computer (information processing apparatus).

The blade servers 2A to 2D may be inserted into a case (not illustrated), for example, and are detachable from the case.

Note that, although the four blade servers 2A to 2D are illustrated in FIG. 1, an arbitrary number of blade servers may be employed. Further, while specific type of servers is described, the present invention is not limited to any particular type of device or server.

The required-power calculation apparatus 3 collects frequency information and communication-state information transmitted from the blade servers 2A to 2D, and calculates electric power required for the blade servers 2A to 2D in accordance with the collected information.

Note that the frequency information and the communication-state information are described in detail hereinafter.

The power-source apparatus 4 supplies the required power calculated by the required-power calculation apparatus 3 to the blade servers 2A to 2D.

The power-source control apparatus 5 controls the power-source apparatus 4.

The blade server 2A includes a CPU (Central Processing Unit) 21, a load measurement unit 22, a frequency controller 23, a load determination unit 24, a communication unit 25, a communication controller 26, and a communication state detector 27.

Note that the blade servers 2B to 2D have the similar configuration(s) as the blade server 2A.

Functions of the load measurement unit 22, the frequency controller 23, the load determination unit 24, the communication unit 25, the communication controller 26, and the communication state detector 27 may be realized by executing predetermined program(s) by the CPU 21 included in the blade server (computer) 2A.

Therefore, the programs which realize the functions in the blade server 2A and a recording medium including the programs are also included in an embodiment of the present invention.

The CPU 21 integrally controls the blade server 2A.

The CPU 21 operates on the basis of each of various operating frequencies.

The load measurement unit 22 monitors the CPU 21 and measures load of the CPU 21.

Specifically, the load measurement unit 22 measures an operating rate of the CPU 21 as the load of the CPU 21.

The load measurement unit 22 outputs the measured operating rate of the CPU 21 to the frequency controller 23 and the load determination unit 24.

The frequency controller 23 determines, among the various operating frequencies, an operating frequency to be assigned to the CPU 21 in accordance with an operating rate of the CPU 21 output from the load measurement unit 22.

It is assumed that three operating frequencies, i.e., 3 GHz, 2.5 GHz, and 2 GHz are provided in an embodiment.

When an operating rate of the CPU 21 is equal to or larger than 80%, the frequency controller 23 of an embodiment determines that the operating frequency to be assigned to the CPU 21 is 3 GHz.

Furthermore, when an operating rate of the CPU 21 is equal to or larger than 20% and smaller than 80%, the frequency controller 23 of an embodiment determines that the operating frequency to be assigned to the CPU 21 is 2.5 GHz.

Moreover, when an operating rate of the CPU 21 is smaller than 20%, the frequency controller 23 of an embodiment determines that the operating frequency to be assigned to the CPU 21 is 2 GHz.

As described above, the frequency controller 23 determines the operating frequency to be assigned to the CPU 21 so that the operating frequency is high when the operating rate of the CPU 21 is high whereas the operating frequency is low when the operating rate of the CPU 21 is low.

The load determination unit 24 determines whether the operating rate of the CPU 21 output from the load measurement unit 22 is equal to or larger than a first threshold value.

In an embodiment, the first threshold value is determined to be 80%.

The first threshold value is recorded in a memory (not illustrated) included in the load determination unit 24.

When it is determined that the operating rate of the CPU 21 is equal to or larger than the first threshold value, the load determination unit 24 generates frequency information representing an operating frequency to be determined by the frequency controller 23 in accordance with the operating rate of the CPU 21.

That is, when it is determined that the operating rate of the CPU 21 is equal to or larger than 80%, the load determination unit 24 of an embodiment generates frequency information representing an operating frequency of 3 GHz to be determined by the frequency controller 23 in accordance with the operating rate of the CPU 21.

The load determination unit 24 transmits the generated frequency information to the required-power calculation apparatus 3.

If the load determination unit 24 receives power-supply-completion information transmitted from the required-power calculation apparatus 3 after transmitting the frequency information to the required-power calculation apparatus 3, the load determination unit 24 outputs the received power-supply-completion information to the frequency controller 23.

Note that the power-supply-completion information represents completion of supply of the required power from the power-source apparatus 4 to the blade servers 2A to 2D.

When receiving the power-supply-completion information output from the load determination unit 24, the frequency controller 23 assigns an operating frequency corresponding to the frequency information generated by the load determination unit 24 to the CPU 21.

By this, a high operating frequency of the CPU 21 is attained.

On the other hand, when it is determined that the operating rate of the CPU 21 is smaller than the first threshold value, the load determination unit 24 determines whether the operating rate of the CPU 21 is smaller than a second threshold value.

Note that the second threshold value is set to 20% in an embodiment.

The second threshold value is also recorded in the memory (not illustrated) included in the load determination unit 24 in advance.

When it is determined that the operating rate of the CPU 21 is smaller than the second threshold value, the load determination unit 24 instructs the frequency controller 23 to assign the operating frequency to be determined by the frequency controller 23 in accordance with the operating rate of the CPU 21 to the CPU 21.

In accordance with the instruction issued by the load determination unit 24, the frequency controller 23 assigns the operating frequency to the CPU 21.

By this, a low operating frequency of the CPU 21 is attained.

Then, the load determination unit 24 generates frequency information representing the operating frequency assigned by the frequency controller 23 to the CPU 21, and transmits the generated frequency information to the required-power calculation apparatus 3. A threshold value may be defined or specified in various ways, including but not limited to a setting by an administrator, specified by a third party, etc.

The communication unit 25 is connected to an external apparatus 6 through a network N.

Note that, in an embodiment, although the blade servers 2B to 2D are also connected to external apparatus(es) through the network N similarly to the blade server 2A, the external apparatuses are not illustrated for simplicity of description.

Note that the network N may correspond to a LAN (Local Area Network) in an embodiment. However, the network N is not limited to this and may correspond to the Internet or a wireless LAN, for example.

The external apparatus 6 corresponds to a hub, a personal computer, or a server, for example.

That is, the communication unit 25 communicates with the external apparatus 6 through the network N.

The communication controller 26 controls communication between the communication unit 25 and the external apparatus 6.

Specifically, when the communication between the communication unit 25 and the external apparatus 6 has not been performed and the blade server 2A attempts start of communication with the external apparatus 6, the communication controller 26 generates a start-requesting signal requesting a start of the communication between the communication unit 25 and the external apparatus 6.

The communication controller 26 outputs the generated start-requesting signal to the communication state detector 27.

When the communication between the communication unit 25 and the external apparatus 6 has not been performed and the external apparatus 6 attempts start of communication with the blade server 2A, the external apparatus 6 generates a start-requesting signal and transmits the generated start-requesting signal to the communication unit 25 through the network N.

The communication unit 25 receives the start-requesting signal transmitted from the external apparatus 6, and outputs the received start-requesting signal to the communication controller 26.

The communication controller 26 outputs the start-requesting signal output from the communication unit 25 to the communication state detector 27.

As described above, the communication controller 26 outputs the start-requesting signal to the communication state detector 27 for the start of the communication between the communication unit 25 and the external apparatus 6.

That is, the communication state detector 27 detects the start-requesting signal transmitted from the communication controller 26.

When detecting the start-requesting signal transmitted from the communication controller 26, the communication state detector 27 determines that the start of the communication between the communication unit 25 and the external apparatus 6 is being attempted in accordance with the detected start-requesting signal.

In this case, the communication state detector 27 generates communication-state information representing that the start of the communication between the communication unit 25 and the external apparatus 6 is attempted.

The communication state detector 27 transmits the generated communication-state information to the required-power calculation apparatus 3.

If the communication state detector 27 receives the power-supply-completion information transmitted from the required-power calculation apparatus 3 after transmitting the communication-state information to the required-power calculation apparatus 3, the communication state detector 27 outputs the received power-supply-completion information to the communication controller 26.

The communication controller 26 controls the communication unit 25 so that the communication between the communication unit 25 and the external apparatus 6 is started when the communication controller 26 receives the power-supply-completion information from the communication state detector 27.

In this way, the communication unit 25 starts communication with the external apparatus 6.

When the communication between the communication unit 25 and the external apparatus 6 is being performed and the blade server 2A attempts stop of the communication with the external apparatus 6, the external apparatus 6 generates a stop-requesting signal requesting stop of the communication between the communication unit 25 and the external apparatus 6.

The communication controller 26 outputs the generated stop-requesting signal to the communication state detector 27.

When the communication between the communication unit 25 and the external apparatus 6 is being performed and the external apparatus 6 attempts stop of the communication with the blade server 2A, the external apparatus 6 generates a stop-requesting signal and transmits the generated stop-requesting signal to the communication unit 25 through the network N.

The communication unit 25 receives the stop-requesting signal transmitted to from the external apparatus 6 and outputs the received stop-requesting signal to the communication controller 26.

The communication controller 26 outputs the stop-requesting signal supplied from the communication unit 25 to the communication state detector 27.

That is, the communication state detector 27 detects the stop-requesting signal transmitted from the communication controller 26.

When detecting the stop-requesting signal transmitted from the communication controller 26, the communication state detector 27 instructs the communication controller 26 to stop the communication between the communication unit 25 and the external apparatus 6 in response to the detected stop-requesting signal.

In accordance with the instruction, the communication controller 26 controls the communication unit 25 so that the communication between the communication unit 25 and the external apparatus 6 is stopped.

In this way, the communication unit 25 stops communication with the external apparatus 6.

In this case, the communication state detector 27 generates communication-state information representing that the communication between the communication unit 25 and the external apparatus 6 is stopped.

The communication state detector 27 transmits the generated communication-state information to the required-power calculation apparatus 3.

FIG. 2 is a block diagram schematically illustrating a configuration of the required-power calculation apparatus 3 according to an embodiment.

The required-power calculation apparatus 3, for example, includes an information collection unit 31, an information recording unit 32, a correspondence-relationship recording unit 33, a required-power calculation unit 34, and a notification unit 35.

Function(s) of the information collection unit 31, the required-power calculation unit 34, and the notification unit 35 are realized by, for example, executing predetermined program(s) by a calculation unit, such as a CPU, included in the required-power calculation apparatus (computer) 3.

Therefore, the program(s) which realize the functions in the required-power calculation apparatus 3 and a recording medium including the programs are also included in an embodiment of the present invention.

The information recording unit 32 and the correspondence-relationship recording unit 33 are realized by storage unit(s) incorporated in the required-power calculation apparatus 3 or storage units which are accessible from the required-power calculation apparatus 3. While the recording units in FIG. 2 are illustrated as separate components, the present invention is not limited thereto.

The information collection unit 31 collects frequency information and communication-state information transmitted from each of the blade servers 2A to 2D and records the collected information to the information recording unit 32.

FIG. 3 is a table listing examples of the correspondence relationship between the frequency information and the communication-state information which are recorded in the information recording unit 32.

The information recording unit 32 of an embodiment records the frequency information and the communication-state information in a table 32A.

As illustrated in FIG. 3, names of the blade servers and the frequency information and the communication-state information are recorded in the table 32A.

Note that reference numerals for identifying the blade servers, such as "blade server 2A", are illustrated in the table 32A as examples for simplicity of description. However, server IDs for uniquely identifying the blade servers are recorded in the table 32A for practical use.

In the table 32A, "communication start" recorded as the communication-state information represents that the communication between the communication unit 25 and the external apparatus 6 is attempted.

Furthermore, "communication stop" recorded as the communication-state information in the table 32A represents that the communication between the communication unit 25 and the external apparatus 6 is stopped.

The correspondence-relationship recording unit 33 records the correspondence relationship between the frequency information and the required power and the correspondence relationship between the communication-state information and the required power.

FIGS. 4A and 4B are tables listing examples of correspondence relationships recorded in a correspondence-relationship recording unit 33 according to an embodiment.

The correspondence-relationship recording unit 33 records the correspondence relationships in tables 33A and 33B.

As illustrated in FIG. 4A, the table 33A includes a correspondence relationship between the frequency information and the required power.

Furthermore, as illustrated in FIG. 4B, the table 33B includes a corresponding relationship between the communication-state information and the required power.

Note that fixed correspondence relationships may be recorded in the correspondence-relationship recording unit 33 in advance, and alternatively, an administrator of the required-power calculation apparatus 3 may update the correspondence relationships as desired.

Specifically, in a first record R1 of the table 33A, when the CPUs 21 of the blade servers 2A to 2D operate in accordance with the operating frequency of 3 GHz, the power required for each of the blade servers 2A to 2D is 80 W.

In a second record R2 of the table 33A, when the CPUs 21 of the blade servers 2A to 2D operate in accordance with the operating frequency of 2.5 GHz, the power required for each of the blade servers 2A to 2D is 50 W.

In a third record R3 of the table 33A, when the CPUs 21 of the blade servers 2A to 2D operate in accordance with the operating frequency of 2 GHz, the power required for each of the blade servers 2A to 2D is 10 W.

In a first record R1 of the table 33B, when the communication between the communication unit 25 and the external apparatus 6 is being performed, the power required for each of the blade servers 2A to 2D is 10 W.

In a second record R2 of the table 33B, when the communication between the communication unit 25 and the external apparatus 6 is not performed, the power required for each of the blade servers 2A to 2D is 1 W.

The required-power calculation unit 34 refers to the information recording unit 32 and the correspondence-relationship recording unit 33 so as to calculate the power required for the blade servers 2A to 2D.

Here, processing of calculating the required power performed by the required-power calculation unit 34 is described in detail with reference to the table 32A in FIG. 3 and the tables 33A and 33B in FIGS. 4A and 4B.

According to the first record R1 of the table 32A, the frequency information of the blade server 2A represents "3 GHz", and the communication-state information of the blade server 2A is "communication start".

Therefore, the required-power calculation unit 34 extracts the required power "80 W" corresponding to the frequency information "3 GHz" from the table 33A.

The required-power calculation unit 34 extracts the required power "10 W" corresponding to the communication-state information "communication start" from the table 33B.

The required-power calculation unit 34 obtains electric power "90 W" required for the blade server 2A by adding the extracted required power "80 W" to the extracted required power "10 W".

Similarly, the required-power calculation unit 34 obtains electric power "51 W" required for the blade server 2B.

Similarly, the required-power calculation unit 34 obtains electric power "20 W" required for the blade server 2C.

Similarly, the required-power calculation unit 34 obtains electric power "81 W" required for the blade server 2D.

The required-power calculation unit 34 adds the required power of the blade servers 2A to 2D to one another (that is, "90 W"+"51 W"+"20 W"+"81 W") so as to obtain electric power "242 W" in total required for the blade servers 2A to 2D.

The required-power calculation unit 34 transmits information on the obtained required power to the power-source control apparatus 5.

If the notification unit 35 received the power-supply-completion information from the power-source control apparatus 5 after the required-power calculation unit 34 transmits the information on the required power to the power-source control apparatus 5, the notification unit 35 transmits the power-supply-completion information to the blade servers 2A to 2D.

Figure 5:
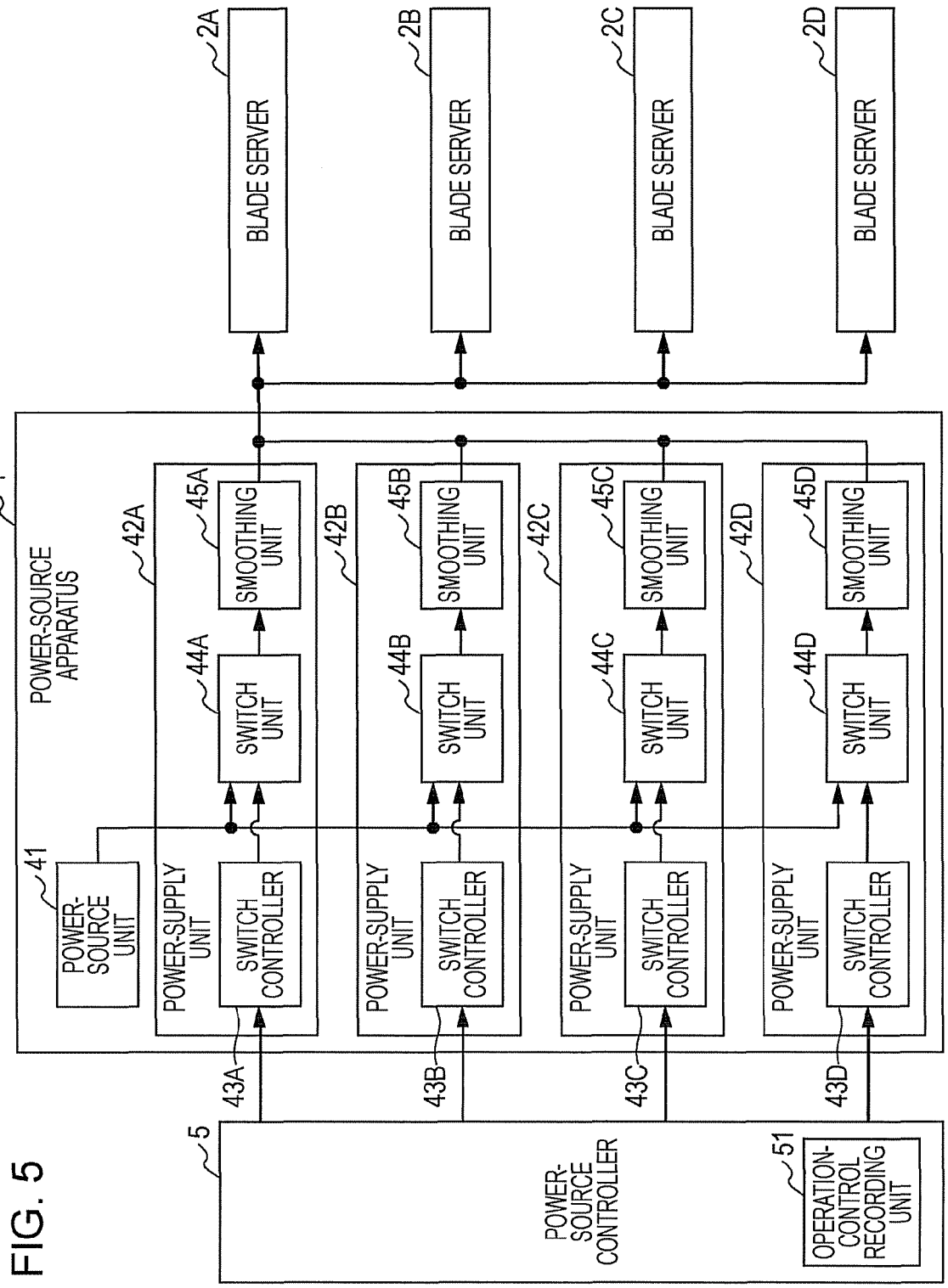
FIG. 5 illustrates schematic configuration(s) of a power-source apparatus and a power-source control apparatus.

FIG. 5 is a block diagram illustrating schematic configurations of the power-source apparatus 4 and the power-source control apparatus 5.

The power-source apparatus 4 includes a power-source unit 41 and power-supply units 42A to 42D.

Note that although the four power-supply units 42A to 42D are illustrated in FIG. 5, the number of power-source units is not limited to this but an arbitrary number of power-source units may be employed.

The power-source unit 41 is a source of generation of electric power.

The power-source unit 41 outputs generated electric power to switch units 44A to 44D of the respective power-supply units 42A to 42D.

The power-supply units 42A to 42D determine whether the electric power output from the power-source unit 41 is to be supplied to the blade servers 2A to 2D.

Therefore, the power-supply units 42A to 42D includes switch controller 43A to 43D, respectively, the switch units 44A to 44D, respectively, and smoothing units 45A to 45D, respectively.

The switch controller 43A to 43D turn on or off the switch units 44A to 44D in accordance with PWM (Pulse Width Modulation) signals supplied from the power-source control apparatus 5.

Specifically, the switch controller 43A to 43D control the switch units 44A to 44D, respectively, so that the switch units 44A to 44D are in on-states while the PWM signals are in "H" (high) states.

Furthermore, the switch controller 43A to 43D control the switch units 44A to 44D, respectively, so that the switch units 44A to 44D are in off-states while the PWM signals are in "L" (low) states.

Each of the switch units 44A to 44D is constituted by an FET (Field Effect Transistor), for example.

When the switch units 44A to 44D are turned on, the switch units 44A to 44D output the electric power supplied from the power-source unit 41 to the smoothing units 45A to 45D.

When the switch units 44A to 44D are turned off, the switch units 44A to 44D do not output the electric power supplied from the power-source unit 41 to the smoothing units 45A to 45D.

The smoothing units 45A to 45D are filters which smooth the electric power output from the switch units 44A to 44D.

The power-source control apparatus 5 includes an operation-control recording unit 51.

The operation-control recording unit 51 records operation-control information specifying power-supply units to be operated selected from among the power-supply units 42A to 42D.

FIG. 6 illustrates examples of operation-control information recorded in an operation-control recording unit.

The operation-control recording unit 51 records the operation-control information in a table 51A.

As illustrated in FIG. 6, the table 51A includes the relationships between required power P and the power-supply units as the operation-control information.

That is, as illustrated in a first record R1 of the table 51A, when the required power P is equal to or larger than 0 W and smaller than 100 W, only the power-supply unit 42A is selected to be operated.

Specifically, as illustrated in the first record R1 of the table 51A, when the power-source apparatus 4 supplies required power P which is equal to or larger than 0 W and smaller than 100 W to the blade servers 2A to 2D, the highest efficiency of power conversion in the power-source apparatus 4 is attained when only the power-supply unit 42A among the power-supply units 42A to 42D is operated.

Furthermore, as illustrated in a second record R2 of the table 51A, when the required power P is equal to or larger than 100 W and smaller than 200 W, the power-supply units 42A and 42B are selected to be operated.

Specifically, as illustrated in the second record R2 of the table 51A, when the power-source apparatus 4 supplies required power P which is equal to or larger than 100 W and smaller than 200 W to the blade servers 2A to 2D, the highest efficiency of power conversion in the power-source apparatus 4 is attained when only the power-supply units 42A and 42B among the power-supply units 42A to 42D are operated.

Moreover, as illustrated in a third record R3 of the table 51A, when the required power P is equal to or larger than 200 W and smaller than 300 W, the power-supply units 42A to 42C are selected to be operated.

Specifically, as illustrated in the third record R3 of the table 51A, when the power-source apparatus 4 supplies required power P which is equal to or larger than 200 W and smaller than 300 W to the blade servers 2A to 2D, the highest efficiency of power conversion in the power-source apparatus 4 is attained when the power-supply units 42A to 42C among the power-supply units 42A to 42D are operated.

Moreover, as illustrated in a fourth record R4 of the table 51A, when the required power P is equal to or larger than 300 W, the power-supply units 42A to 42D are selected to be operated.

Specifically, as illustrated in the fourth record R4 of the table 51A, when the power-source apparatus 4 supplies the required power P equal to or larger than 300 W to the blade servers 2A to 2D, the highest efficiency of power conversion in the power-source apparatus 4 is attained when all the power-supply units 42A to 42D are operated.

As described above, the operation-control recording unit 51 includes information on the power-supply units to be operated in order to attain high efficiency of power conversion of the power-source apparatus 4 irrespective of the electric power required for the blade servers 2A to 2D.

Since the power-source control apparatus 5 includes the operation-control recording unit 51, even when consumption current of the blade servers 2A to 2D is high or low, high efficiency of the power conversion of the power-source apparatus 4 is maintained.

Note that the operation-control information recorded in the operation-control recording unit 51 is obtained by actually measuring the number of power-supply units, from among the power-supply units 42A to 42D, used to attain the highest efficiency of power conversion of the power-source apparatus 4 in advance.

When receiving information on the required power transmitted from the required-power calculation apparatus 3, the power-source control apparatus 5 extracts information on the power-supply units corresponding to the received information on the required power from the operation-control recording unit 51.

The power-source control apparatus 5 transmits PWM signals to the extracted power-supply units so that the power-supply units supply the required power to the blade servers 2A to 2D.

Note that the power-source control apparatus 5 transmits an "L" signal to power-supply units other than the extracted power-supply units.

It is assumed that information on a required power of 242 W is supplied from the required-power calculation apparatus 3.

In this case, the power-source control apparatus 5 extracts information representing the power-supply units 42A to 42C corresponding to the required power of 242 W supplied from the required-power calculation apparatus 3 from the table 51A illustrated in FIG. 6.

The power-source control apparatus 5 transmits PWM signals to the power-supply units 42A to 42C and transmits an "L" signal to the power-supply unit 42D.

In this way, the power-source apparatus 4 operates the power-supply units 42A to 42C so as to supply the required power corresponding to the information transmitted from the required-power calculation apparatus 3 to the blade servers 2A to 2D.

After the power-source apparatus 4 supplies the required power in accordance with the PWM signals transmitted from the power-source control apparatus 5, the power-source control apparatus 5 transmits power-supply-completion information to the required-power calculation apparatus 3.

Next, operation of the power-source control system 1 having the configuration described above is described with reference to FIGS. 7 to 10.

Figure 7:
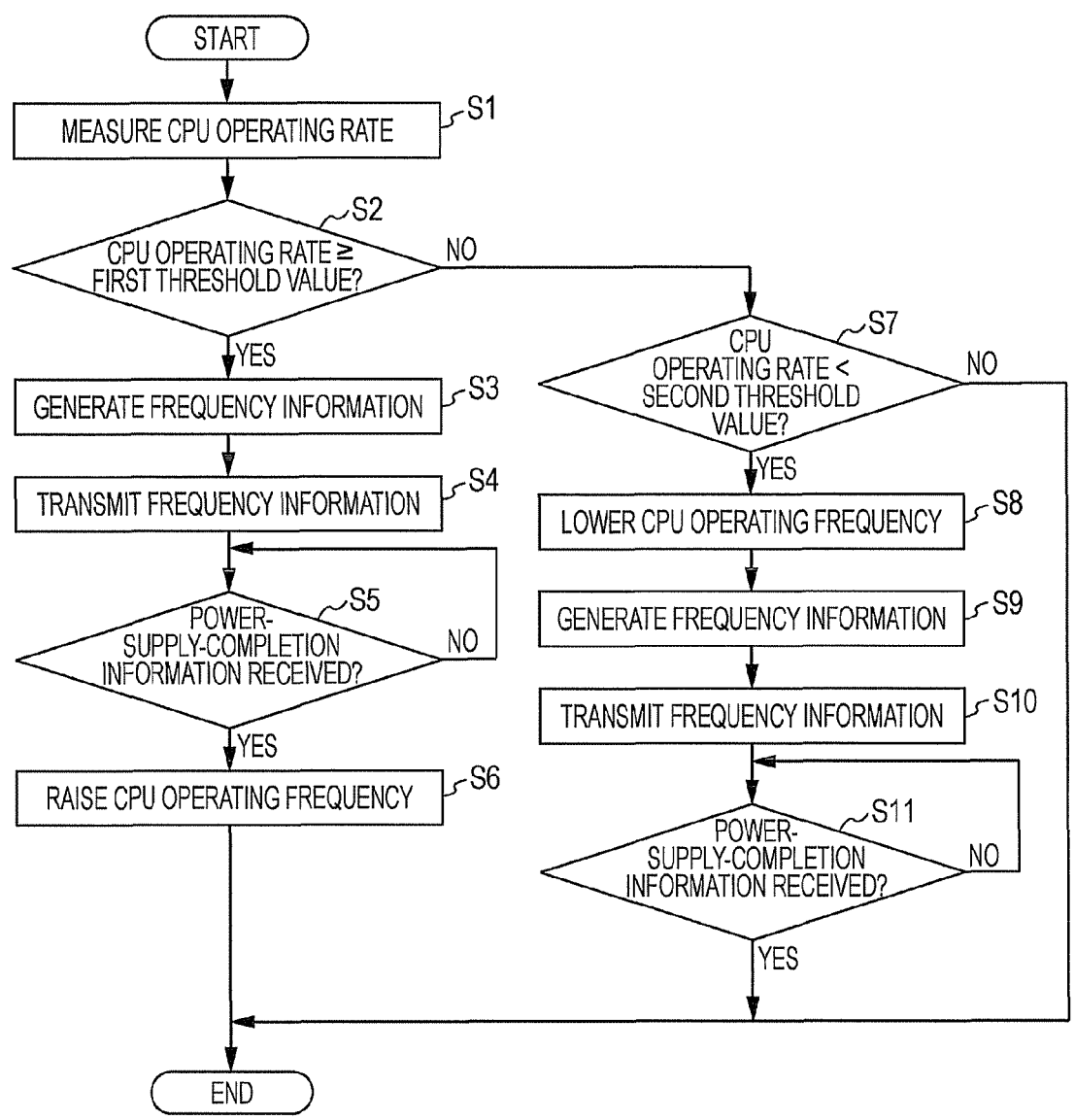
FIG. 7 illustrates an operation example of a blade server when a load measurement unit measures a CPU operating rate.

FIG. 7 illustrates an operation example of a blade server when the load measurement unit 22 measures CPU 21 operating rate.

Note that the blade servers 2B to 2D operate similarly to the blade server 2A.

As illustrated in FIG. 7, the load measurement unit 22 monitors the CPU 21 and measures the operating rate of the CPU 21 (Operation S1).

In Operation S2, the load determination unit 24 determines whether the operating rate of the CPU 21 measured in Operation S1 is equal to or larger than a first threshold value.

Note that the first threshold value is set to 80% in an embodiment.

When the determination is affirmative in Operation S2, the load determination unit 24 generates frequency information representing an operating frequency to be determined by the frequency controller 23 in accordance with the operating rate of the CPU 21 in Operation S3.

Then, the load determination unit 24 transmits the frequency information generated in Operation S3 to the required-power calculation apparatus 3 in Operation S4.

On the other hand, when the determination is negative in Operation S2, determination processing is performed in Operation S7.

After the operation in Operation S4, the load determination unit 24 determines whether power-supply-completion information is received from the required-power calculation apparatus 3 in Operation S5.

When the determination is affirmative in Operation S5, the received power-supply-completion information is output to the frequency controller 23.

Then, the frequency controller 23 assigns the operating frequency represented by the frequency information generated by the load determination unit 24 to the CPU 21 so that a high operating frequency of the CPU 21 is attained in Operation S6.

On the other hand, when the determination is negative in Operation S5, the process returns to Operation S5 and the determination processing in Operation S5 is performed again.

As described above, since the operating frequency of the CPU 21 is raised after the electric power to be used in the blade servers 2A to 2D is increased, shortage of the electric power to be used in the blade servers 2A to 2D does not occur.

Therefore, malfunction of the blade servers 2A to 2D does not occur.

In Operation S7, the load determination unit 24 determines whether the operating rate of the CPU 21 is smaller than a second threshold value.

Note that the second threshold value is set to 20% in an embodiment.

When the determination is affirmative in Operation S7, the load determination unit 24 instructs the frequency controller 23 to assign the operating frequency to be determined by the frequency controller 23 to the CPU 21 in accordance with the operating rate of the CPU 21.

In accordance with the instruction issued by the load determination unit 24, the frequency controller 23 assigns the operating frequency to the CPU 21 so that a low operating frequency of the CPU 21 is attained in Operation S8.

On the other hand, when the determination is negative in Operation S7, the process illustrated in FIG. 7 is terminated.

After the operation in Operation S8, the frequency controller 23 generates frequency information representing the operating frequency assigned to the CPU 21 in Operation S9.

Then, the load determination unit 24 transmits the frequency information generated in Operation S9 to the required-power calculation apparatus 3 in Operation S10.

In Operation S11, the load determination unit 24 determines whether power-supply-completion information has been received from the required-power calculation apparatus 3.

When the determination is affirmative in Operation S11, the process illustrated in FIG. 7 is terminated.

On the other hand, when the determination is negative in Operation S11, the process returns to Operation S11 and the determination processing in Operation S11 is performed again.

As described above, since the operating frequency of the CPU 21 is lowered after the power to be used in the blade servers 2A to 2D is reduced, shortage of the electric power to be used in the blade servers 2A to 2D does not occur.

Therefore, malfunction of the blade servers 2A to 2D does not occur.

Figure 8:
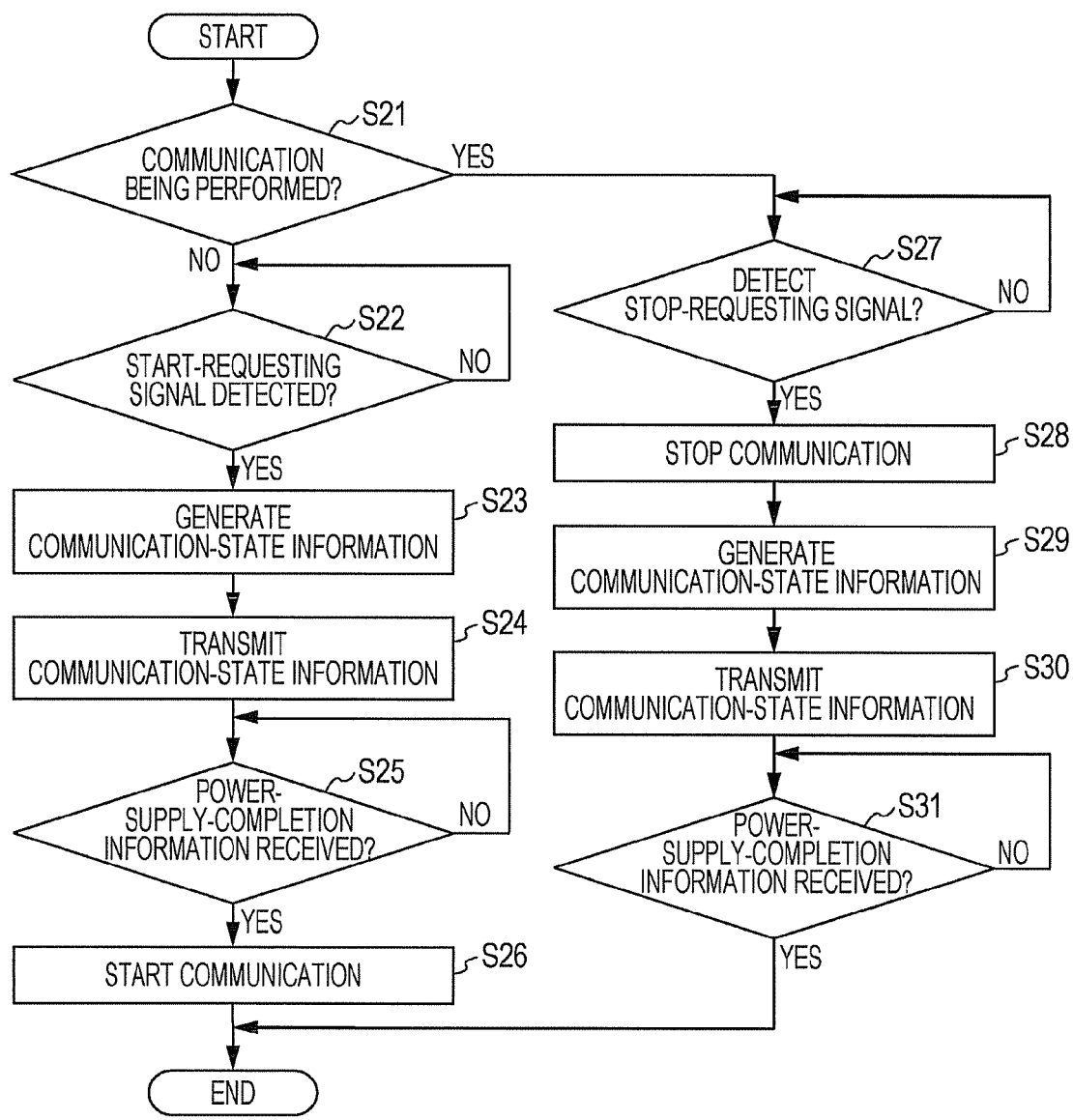
FIG. 8 illustrates an operation example of a blade server when a communication state detector detects a start-requesting signal or a stop-requesting signal transmitted from a communication controller.

FIG. 8 is a flowchart illustrating an operation example of the blade server 2A when the communication state detector 27 detects a start-requesting signal or a stop-requesting signal from the communication controller 26.

As illustrated in FIG. 8, when the communication between the communication unit 25 and the external apparatus 6 is not performed ("NO" in Operation S21), the communication state detector 27 determines whether a start-requesting signal transmitted from the communication controller 26 is detected in Operation S22.

Note that the start-requesting signal is supplied when start of the communication between the communication unit 25 and the external apparatus 6 is requested.

When the determination is affirmative in Operation S22, the communication state detector 27 generates communication-state information representing that the communication between the communication unit 25 and the external apparatus 6 is being attempted in Operation S23.

In Operation S24, the communication state detector 27 transmits the communication-state information generated in Operation S23 to the required-power calculation apparatus 3.

On the other hand, when the determination is negative in Operation S22, the process returns to Operation S22 and the determination processing in Operation S22 is performed again.

After the operation in Operation S24, the communication state detector 27 determines whether power-supply-completion information is received from the required-power calculation apparatus 3 in Operation S25.

When the determination is affirmative in Operation S25, the communication state detector 27 outputs the received power-supply-completion information to the communication controller 26.

Then, the communication controller 26 controls the communication unit 25 to start the communication between the communication unit 25 and the external apparatus 6.

In this way, the communication unit 25 starts the communication with the external apparatus 6 in Operation S26.

On the other hand, when the determination is negative in Operation S25, the process returns to Operation S25 and the determination processing in Operation S25 is performed again.

As described above, since the operating frequency of the CPU 21 is raised after the electric power to be used in the blade servers 2A to 2D is increased, shortage of the electric power to be used in the blade servers 2A to 2D does not occur.

Therefore, malfunction of the blade servers 2A to 2D does not occur.

Then the determination is affirmative in Operation S21, the communication state detector 27 determines whether a stop-requesting signal transmitted from the communication controller 26 is detected in Operation S27.

Note that the stop-requesting signal is supplied when stop of the communication between the communication unit 25 and the external apparatus 6 is requested.

When the determination is affirmative in Operation S27, the communication state detector 27 instructs the communication controller 26 to stop the communication between the communication unit 25 and the external apparatus 6.

In accordance with the instruction, the communication controller 26 instructs the communication unit 25 to stop the communication between the communication unit 25 and the external apparatus 6.

In this way, the communication unit 25 stops the communication with the external apparatus 6 in Operation S28.

On the other hand, when the determination is negative in Operation S27, the process returns to Operation S27 and the determination processing in Operation S27 is performed again.

After the operation in Operation S28, the communication state detector 27 generates communication-state information representing that the communication between the communication unit 25 and the external apparatus 6 has been stopped in Operation S29.

Then, the communication state detector 27 transmits the communication-state information generated in Operation S29 to the required-power calculation apparatus 3 in step S30.

After the operation in Operation S30, the communication state detector 27 determines whether power-supply-completion information is received from the required-power calculation apparatus 3 in Operation S31.

When the determination is affirmative in Operation S31, the process illustrated in FIG. 8 is terminated.

On the other hand, when the determination is negative in Operation S31, the process returns to Operation S31 and the determination processing in Operation S31 is performed again.

As described above, since the electric power to be used in the blade servers 2A to 2D is reduced after the communication between the communication unit 25 and the external apparatus 6 is stopped, shortage of the electric power to be used in the blade servers 2A to 2D does not occur.

Therefore, malfunction of the blade servers 2A to 2D does not occur.

Figure 9:
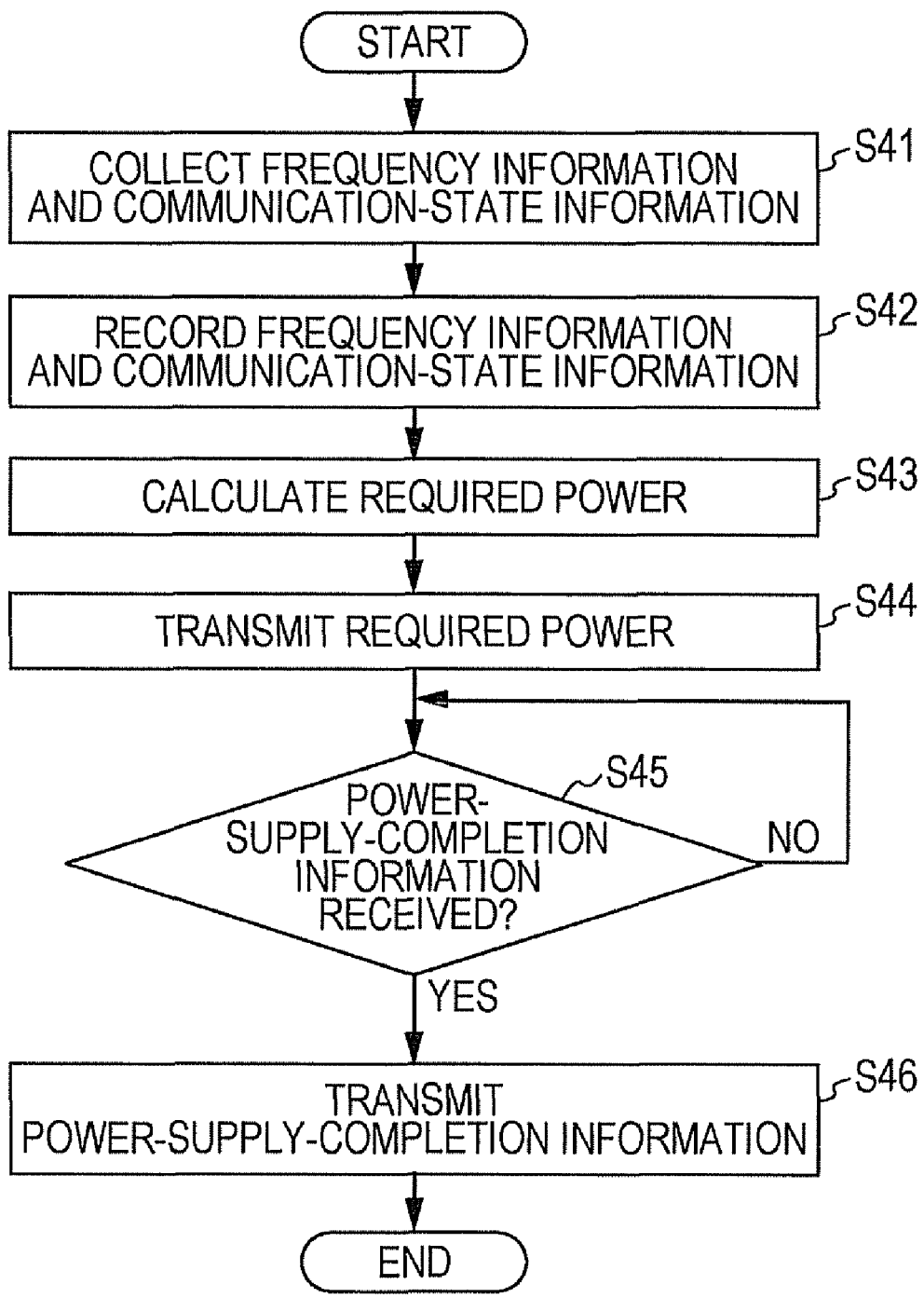
FIG. 9 illustrates an operation example of a required-power calculation apparatus when frequency information and communication-state information supplied from various blade servers are collected.

FIG. 9 is a flowchart illustrating an operation example of the required-power calculation apparatus 3 when frequency information and communication-state information supplied from the blade servers 2A to 2D are collected.

As illustrated in FIG. 9, the information collection unit 31 collects frequency information and communication-state information from each of the blade servers 2A to 2D in Operation S41.

In Operation S42, the information collection unit 31, for example, records the frequency information and the communication-state information collected in Operation S41 to the information recording unit 32.

In Operation S43, the required-power calculation unit 34, for example, calculates electric power required for the blade servers 2A to 2D with reference to the information recording unit 32 and the correspondence-relationship recording unit 33.

In Operation S44, the required-power calculation unit 34, for example, transmits the required power calculated in Operation S43 to the power-source control apparatus 5.

In Operation S45, the notification unit 35, for example, determines whether power-supply-completion information has been received from the power-source control apparatus 5.

When the determination is affirmative in Operation S45, the notification unit 35 transmits the received power-supply-completion information to the blade servers 2A to 2D in Operation S46.

On the other hand, when the determination is negative in Operation S45, the process returns to Operation S45 and the determination processing in Operation S45 is performed again.

Figure 10:
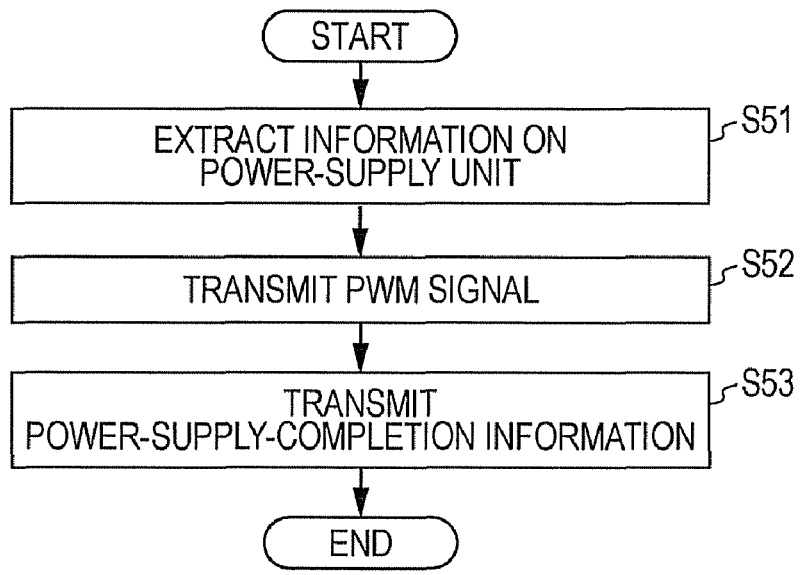
FIG. 10 illustrates an operation example of a power-source control apparatus when the power-source control apparatus receives information on required power supplied from the required-power calculation apparatus.
Figure 11:
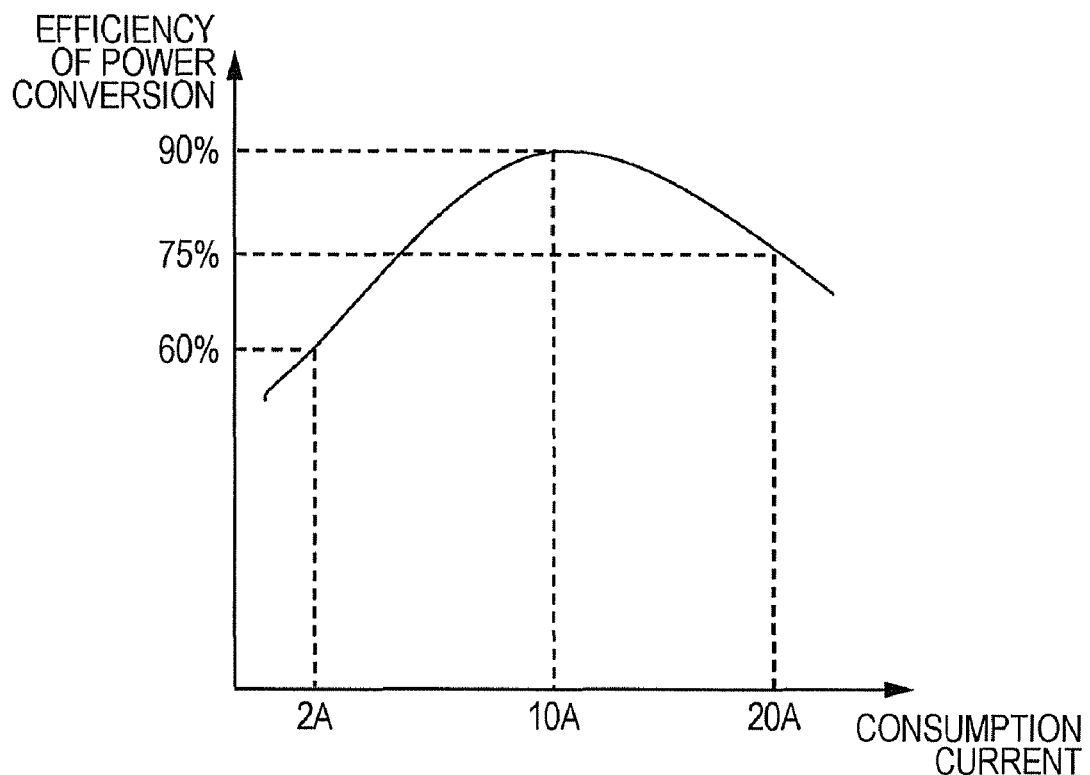
FIG. 11 illustrates a relationship between efficiency of power conversion of a power-source apparatus and a consumption current of an information processing apparatus.

FIG. 10 is a flowchart illustrating an operation example of the power-source control apparatus 5 when the power-source control apparatus 5 receives information on required power supplied from the required-power calculation apparatus 3.

As illustrated in FIG. 10, the power-source control apparatus 5 extracts information on power-supply units corresponding to received information on required power from the operation-control recording unit 51 in Operation S51.

In Operation S52, the power-source control apparatus 5, for example, transmits PWM signals to the power-supply units extracted in Operation S51 so that required power corresponding to the received information is supplied to the blade servers 2A to 2D.

Note that the power-source control apparatus 5 transmits "L" signals to power-supply units other than the power-supply units corresponding to the information extracted in Operation S51.

In Operation S53, the power-source control apparatus 5, for example, transmits power-supply-completion information to the required-power calculation apparatus 3 when the power-source apparatus 4 supplied the required power to the blade servers 2A to 2D in accordance with the PWM signals transmitted in Operation S52.

As described above, according to the power-source control system of an embodiment, malfunction of the blade servers is prevented, and moreover, high efficiency of power conversion of the power-source apparatus is maintained.

Note that although the power-source control system includes the blade servers in an embodiment, the present invention is not limited to this.

For example, the power-source control system may include personal computers or servers other than the blade servers instead of the blade servers.

Furthermore, although each of the blade servers includes the CPU, the load measurement unit, the frequency controller, the load determination unit, the communication unit, the communication controller, and the communication-state detector, the present invention is not limited to this.

For example, each of the blade servers may only include the CPU, the load measurement unit, the frequency controller, and the load determination unit.

In this case, the required-power calculation apparatus calculates required power only in accordance with the frequency information transmitted from the blade servers.

Alternatively, each of the blade servers may only include the communication unit, the communication controller, and the communication-state detector.

In this case, the required-power calculation apparatus calculates required power only in accordance with the communication-state information transmitted from the blade servers.

That is, the present invention is not limited to the embodiment described above, and various modifications may be made within the scope of the claims.

Embodiments obtained by combining technical units appropriately modified within the scope of the claims are also included in the present invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power-source control system comprising:
    at least one information processing apparatus;
    a required-power calculation apparatus which calculates a required power representing electric power to be supplied to the information processing apparatus;
    a power-source apparatus which supplies the electric power calculated by the required-power calculation apparatus to the information processing apparatus; and
    a power-source controller which controls the power-source apparatus,
    wherein the information processing apparatus includes:
        a CPU configured to operate in accordance with each of various operating frequencies,
        a load measurement unit configured to measure a load of the CPU, a frequency controller configured to determine an operating frequency to be assigned to the CPU from among the various operating frequencies so that when a heavy load is applied to the CPU, a high operating frequency is attained and when a light load is applied to the CPU, a low operating frequency is attained,
        a load determination unit configured to generate frequency information representing the operating frequency to be determined by the frequency controller in accordance with the load of the CPU, and to transmit the generated frequency information to the required-power calculation apparatus, and
    the required-power calculation apparatus calculates the required power representing the electric power required for the information processing apparatus so that the CPU operates at the operating frequency represented by the frequency information received from the load determination unit,
    the power-source controller controls the power-source apparatus so that a highest efficiency of power conversion is attained in the power-source apparatus when the power-source apparatus supplies the required power calculated by the required-power calculation apparatus to the information processing apparatus,
    the power-supply apparatus adjusts electric power to be used in the information processing apparatus by supplying electric power corresponding to the required power calculated by the required power calculation apparatus to the information processing apparatus, and the frequency controller changes the operating frequency of the CPU by assigning the operating frequency represented by the frequency information to the CPU after the electric power to be used in the information processing apparatus is adjusted using the required power calculated by the required-power calculation unit.

2. The power-supply control system according to claim 1, wherein the load determination unit determines whether the load of the CPU is smaller than a threshold value, instructs the frequency controller to assign the operating frequency to be determined by the frequency controller in accordance with the load of the CPU when determining that the load of the CPU is smaller than the threshold value, generates frequency information representing the operating frequency assigned to the CPU by the frequency controller after operating frequency of the CPU is lowered by assigning the operating frequency to the CPU by the frequency controller in accordance with the instruction, and transmits the generated frequency information to the required-power calculation apparatus, and the power-source apparatus reduces the electric power to be used in the information processing apparatus by supplying the required power calculated by the required-power calculation apparatus to the information processing apparatus.

3. The power-supply control system according to claim 1, wherein the electrical power used by the information processing apparatus is reduced after the operating frequency of the CPU is adjusted.

4. A power-source control system comprising:
at least one information processing apparatus;
a required-power calculation apparatus which calculates a required power representing electric power to be supplied to the information processing apparatus;
a power-source apparatus which supplies electric power corresponding to the required power calculated by the required-power calculation apparatus to the information processing apparatus; and
a power-source controller which controls the power-source apparatus,
wherein the information processing apparatus includes:
a communication unit configured to communicate with an external apparatus,
a communication controller configured to control communication between the communication unit and the external apparatus, and
a communication-state detector configured to, when the communication between the communication unit and the external apparatus has not been performed and a start-requesting signal requesting start of the communication between the communication unit and the external apparatus transmitted from the communication controller is detected, generate communication-state information representing that start of the communication between the communication unit and the external apparatus is attempted in accordance with the detected start-requesting signal, and transmit the generated communication-state information to the required power calculation apparatus, the required-power calculation apparatus calculates the required power representing electric power required for the information processing apparatus in accordance with the communication-state information transmitted from the communication-state detector such that the required power is increased when the communication between the communication unit and the external apparatus is performed whereas the required power is reduced when the communication between the communication unit and the external apparatus is not performed, the power-source controller controls the power-source apparatus so that the highest efficiency of power conversion is attained in the power-source apparatus when the power-source apparatus supplies electric power corresponding to the required power calculated by the required-power calculation apparatus to the information processing apparatus, the power-supply apparatus adjusts electric power to be used in the information processing apparatus by supplying electric power corresponding to the required power calculated by the required power calculation apparatus to the information processing apparatus, and the communication controller controls the communication unit so that the communication between the communication unit and the external apparatus is started after the electric power to be used in the information processing apparatus is adjusted using the required power calculated by the required-power calculation unit.

5. The power-source control system according to claim 4, wherein, in a case where the communication between the communication unit and the external apparatus is being performed, the communication-state detector instructs the communication controller to stop the communication between the communication unit and the external apparatus when detecting a stop-requesting signal requesting the communication between the communication unit and the external apparatus to stop, generates communication-state information representing that the communication between the communication unit and the external apparatus is stopped after communication between the communication unit and the external apparatus is stopped in accordance with the instruction, and transmits the generated communication-state information to the required-power calculation apparatus, and the power-source apparatus reduces the electric power to be used in the information processing apparatus by supplying the required power calculated by the required-power calculation apparatus to the information processing apparatus.

6. The power-supply control system according to claim 4, wherein the electrical power used by the information processing apparatus is reduced after the communication between the communication unit and the external apparatus is stopped.

7. A method of controlling electric power performed by a power-source control system including at least one information processing apparatus, the method comprising:
measuring a load of a CPU;
determining an operating frequency to be assigned to the CPU from among various operating frequencies such that when a heavy load is applied to the CPU, a high operating frequency is attained and when a light load is applied to the CPU, a low operating frequency is attained, the determining being performed by a frequency controller;
generating frequency information representing the operating frequency to be determined by the frequency controller in accordance with the load of the CPU;
transmitting the generated frequency information to a required-power calculation apparatus;
calculating the required power for the information processing apparatus so that the CPU operates at the operating frequency represented by the frequency information, controlling a power-source apparatus so that a highest efficiency of power conversion is attained in the power-source apparatus when the power-source apparatus supplies the required power calculated to the information processing apparatus, adjusting electric power to be used in the information processing apparatus by supplying electric power corresponding to the required power calculated; and changing the operating frequency of the CPU by assigning the operating frequency represented by the frequency information to the CPU after the electric power to be used in the information processing apparatus is adjusted using the required power calculated.

8. The method according to claim 7, wherein the electrical power used by the information processing apparatus is reduced after the operating frequency of the CPU is adjusted.

9. A method of controlling electric power performed by a power-source control system including at least one information processing apparatus, the method comprising:

controlling communication between a communication unit and an external apparatus, the controlling being performed by a communication controller;

generating communication-state information indicating that a start of the communication between the communication unit and the external apparatus is attempted in accordance with a detected start-requesting signal when the communication between the communication unit and the external unit has not been performed and the start-requesting signal requesting start of the communication between the communication unit and the external apparatus transmitted from the communication controller is detected;

transmitting the generated communication-state information to the required power calculation apparatus, calculating the required power representing the electric power required for the information processing apparatus in accordance with the communication-state information transmitted such that the required power is increased when the communication between the communication unit and the external apparatus is performed and the required power is reduced when the communication between the communication unit and the external apparatus is not performed;

controlling the power-source apparatus so that a highest efficiency of power conversion is attained in the power-source apparatus when the power-source apparatus supplies electric power corresponding to the required power calculated by the required-power calculation apparatus to the information processing apparatus;

adjusting electric power to be used in the information processing apparatus by supplying electric power corresponding to the required power calculated to the information processing apparatus; and controlling the communication unit so that the communication between the communication unit and the external apparatus is started after the electric power to be used in the information processing apparatus is adjusted using the required power calculated.

10. The method according to claim 9, wherein the electrical power used by the information processing apparatus is reduced after the communication between the communication unit and the external apparatus is stopped.

* * * * *

UNITED STATES PATENT AND TRADEMARK OFFICE
CERTIFICATE OF CORRECTION

PATENT NO. : 8,205,103 B2
APPLICATION NO. : 12/536936
DATED : June 19, 2012
INVENTOR(S) : Satoshi Kazama et al.

It is certified that error appears in the above-identified patent and that said Letters Patent is hereby corrected as shown below:

Column 19, Line 19, In Claim 2, after "after", insert -- the --.

Column 20, Line 35, In Claim 5, after "after", insert -- the --.

Signed and Sealed this
Fourteenth Day of August, 2012

David J. Kappos
*Director of the United States Patent and Trademark Office*